(12) United States Patent
He et al.

(10) Patent No.: US 9,407,864 B2
(45) Date of Patent: Aug. 2, 2016

(54) DATA PROCESSING METHOD AND ELECTRONIC DEVICE

(71) Applicants: Beijing Lenovo Software, Ltd., Haidian District, Beijing (CN); Lenovo (Beijing) Co., Ltd., Haidian District, Beijing (CN)

(72) Inventors: Zhiqiang He, Beijing (CN); Yannan Chen, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 37 days.

(21) Appl. No.: 14/230,075

(22) Filed: Mar. 31, 2014

(65) Prior Publication Data
US 2015/0029297 A1 Jan. 29, 2015

(30) Foreign Application Priority Data

Jul. 25, 2013 (CN) .......................... 2013 1 0316891
Sep. 15, 2013 (CN) .......................... 2013 1 0437114

(51) Int. Cl.
*H04N 7/14* (2006.01)
*H04N 7/15* (2006.01)
*H04L 29/06* (2006.01)
*H04L 12/18* (2006.01)
*G06K 9/00* (2006.01)

(52) U.S. Cl.
CPC ............ *H04N 7/147* (2013.01); *H04L 12/1831* (2013.01); *H04L 65/1089* (2013.01); *H04L 65/4015* (2013.01); *H04N 7/155* (2013.01); *G06K 9/00335* (2013.01)

(58) Field of Classification Search
None
See application file for complete search history.

(56) References Cited

U.S. PATENT DOCUMENTS

2011/0053570 A1* 3/2011 Song ................. H04M 1/27455
455/414.1
2012/0223939 A1* 9/2012 Noh .................... H04N 13/0029
345/419

* cited by examiner

*Primary Examiner* — Maria El-Zoobi
(74) *Attorney, Agent, or Firm* — Brinks Gilson & Lione; G. Peter Nichols

(57) ABSTRACT

A data processing method and an electronic device that include acquiring a first image, determining whether the first image satisfies a preset condition, and executing a first predetermined processing when the first image satisfies the preset condition.

13 Claims, 5 Drawing Sheets

```
┌─────────────────────────────────────────────┐      100
│ During a video communication, analyzing    │      ───
│ at least a part of a body image of a        │
│ communicator in the video communication     │
│ on basis of communication images of the     │ ~ S101
│ video communication, so as to monitor an    │
│ action of the communicator in real time     │
└─────────────────────────────────────────────┘
                      │
                      ▼
┌─────────────────────────────────────────────┐
│ When an action of the communicator matches  │
│ a target action in a preset set of actions, │
│ storing target image frames among           │ ~ S102
│ communication images on basis of the action │
│ of the communicator that matches the target │
│ action                                      │
└─────────────────────────────────────────────┘
```

DATA PROCESSING METHOD AND ELECTRONIC DEVICE

BACKGROUND

This application claims priority to Chinese patent application No. 201310316891.7 filed on Jul. 25, 2013, and Chinese patent application No. 201310437114.8 filed on Sep. 15, 2013 the entire contents of which are incorporated herein by reference.

The present invention relates to a data processing method and an electronic device.

In recent years, with the popularization of electronic devices such as desktop computers, notebook computers, tablet computers, smart phones among the others, people not only can perform voice communication, text transmission easily, but also can perform video communication conveniently. During a video communication, a user often shows emotions like excitement, pleasure, and so on when talking about certain topics with relatives, friends, etc. However, these scenes fleet, the user cannot keep these memorable clips. Although at present it is proposed to store video images from start of the communication to end thereof to facilitate the user viewing after the communication, and the user can manually cut a desired image, this approach is cumbersome and the acquired image is unnatural, and often many wonderful moments are omitted.

In addition, at present, people can share uploaded pictures and videos and so on with friends that are video-communicated on an instant messaging software like QQ, Wechat etc., in a traditional sharing mode, when friends are video chatting, if seeing a picture shared by the counterpart, usually evaluation on the uploaded image can be expressed by clicking on a picture identifier like "Support", "Praise", "Red heart" etc. below the picture or manually entering texts.

However, in the traditional evaluation mode, people need to use a keyboard or a mouse to enter or click some picture identifiers or enter texts, this mode needs to be completed manually, if a mistaken operation occurs on the keyboard or the mouse, erroneous evaluation information will be produced.

SUMMARY

The embodiments of the present invention aim to provide a data processing method and an electronic device to solve the above problem.

An embodiment of the present invention provides a data processing method applied to a first electronic device having a first image acquisition unit and a first display unit, the method comprising: acquiring a first image, determining whether the first image satisfies a preset condition, and executing a first predetermined processing when the first image satisfies the preset condition.

Preferably, acquiring a first image, determining whether the first image satisfies a preset condition, and executing a first predetermined processing when the first image satisfies the preset condition comprises: during a video communication, analyzing at least a part of a body image of a communicator in the video communication on basis of communication images of the video communication, so as to monitor an action of the communicator in real time; and when an action of the communicator matches a target action in a preset set of actions, storing target image frames among communication images on basis of the action of the communicator that matches the target action, wherein the set of actions includes at least one target action.

Preferably, storing target image frames among the communication images on basis of the action of the communicator that matches the target action comprises: when the video communication ends, sequencing the target image frames on basis of acquiring time of the target image frames so as to generate a target image frame sequence; and storing the target image frame sequence.

Preferably, during the video communication, when an action that matches the target action in the preset set of actions appears multiple times and target image frames corresponding to the action that matches the target action are stored multiple times, as the video communication ends, the target image frames stored multiple times are sequenced in terms of the acquiring time of the target image frames to which each action that matches the target action corresponds, so as to generate a target image frame sequence.

Preferably, during the video communication, analyzing at least a part of a body image of a communicator in the video communication on basis of communication images of the video communication, so as to monitor an action of the communicator in real time comprises:

a body image of at least one communicator in the video communication can be analyzed on basis of communication images acquired by an initiating terminal device of the video communication and communication images acquired by a called terminal device, so as to monitor a body action of the communicator in real time.

Preferably, the target image frames include a first target image frame and a second target image frame;

the first target image frame is an image frame including an action of the communicator that matches the target action among communication images acquired by one of an initiating terminal device and a called terminal device; and the second target image frame is an image frame having the same acquiring time as the first target image frame among image frames acquired by the other of the initiating terminal device and the called terminal device.

Preferably, the target image frames include a first target image frame and a second target image frame;

the first target image frame is an image frame including an action of the communicator that matches the target action among communication images acquired by one of an initiating terminal device and a called terminal device; and the second target image frame is an image frame having an acquiring time that lags behind that of the first target image frame by a predetermined time amount among image frames acquired by the other of the initiating terminal device and the called terminal device.

Preferably, the target image frames are image frames among composite communication images generated from communication images acquired by the initiating terminal device and communication images acquired by the called terminal device during the video communication.

Preferably, the method is applied to a terminal device, during the video communication, analyzing at least a part of a body image of a communicator in the video communication on basis of communication images of the video communication, so as to monitor an action of the communicator in real time comprises:

analyzing a body image of a communicator in the video communication on basis of communication images acquired by the terminal device, so as to monitor a body action of the communicator in real time.

Preferably, the method is applied to a terminal device, during the video communication, analyzing at least a part of a body image of a communicator in the video communication on basis of communication images of the video communication, so as to monitor an action of the communicator in real time comprises:

analyzing a body image of a communicator in the video communication on basis of communication images received by the terminal device from other terminal devices, so as to monitor a body action of the communicator in real time.

Preferably, the method is applied to a server, during the video communication, analyzing at least a part of a body image of a communicator in the video communication on basis of communication images of the video communication, so as to monitor an action of the communicator in real time comprises:

analyzing a body image of a communicator in the video communication on basis of communication images from a terminal device, so as to monitor an action of the communicator in real time.

Preferably, the method further comprises:

when the video communication ends, storing a communication image frame sequence including communication images from start of the video communication to end thereof; and associating a communication image frame sequence for a video communication with a target image frame sequence stored for the video communication.

Preferably, the target action is a preset action, the set of actions includes a plurality of the preset actions, or the target action is an action whose action range exceeds a predetermined threshold value as compared with a standard action, wherein the standard action is determined on basis of communication images during a predetermined time period from start of the video communication.

Preferably, acquiring a first image, determining whether the first image satisfies a preset condition, and executing a first predetermined processing when the first image satisfies the preset condition comprises:

displaying a first object by the first display unit;

acquiring a first image by the first image acquisition unit to determine whether the first image satisfies a preset condition, and generating a first label when the first image satisfies the preset condition; and obtaining first information that includes first association information indicating that the first label and the first object are associated.

Preferably, in the above method, the first information further includes: the first label, and/or first correspondence information that the first image and pre-stored data correspond.

Preferably, in the above method, the first label includes:

the first image, or an image obtained after processing the first image, or pre-stored data to which the first image corresponds.

Preferably, the above method further comprises:

simultaneously displaying the first label and the first object.

Preferably, the above method further comprises storing the first information.

Preferably, the above method further comprises:

in a communication state of the first electronic device and a second electronic device, simultaneously displaying the first image on a second display unit of the second electronic device; and transmitting the first information to the second electronic device, displaying the first label on the second display unit on basis of the first information after the first information is received by the second electronic device;

Preferably, the above method further comprises:

acquiring second information of the second electronic device, wherein the second information includes second association information indicating that the second label and the first object are associated, and the second label is a label generated when the second image acquired by the second image acquisition unit of the second electronic device satisfies the preset condition.

Preferably, the above method further comprises:

acquiring the second label through the second information, and meanwhile displaying the second label, wherein the second label includes the second image, or pre-stored data to which the second image corresponds.

Another embodiment of the present invention provides an electronic device, comprising:

an image acquisition unit for acquiring a first image; a first display unit; and a processing unit for determining whether the first image satisfies a preset condition, and executing a first predetermined processing when the first image satisfies the preset condition Preferably, the processing unit further includes an action detection unit for, during a video communication, analyzing at least a part of a body image of a communicator in the video communication on basis of communication images of the video communication, so as to monitor an action of the communicator in real time; and the electronic device further comprises as storage unit configured for, when an action of the communicator matches a target action in a preset set of actions, storing target image frames among the communication images on basis of the action of the communicator that matches the target action, wherein the set of actions includes at least one target action.

Preferably, the storage unit includes:

a sequence generation module configured for, when the video communication ends, sequencing the target image frames on basis of acquiring time of the target image frames so as to generate a target image frame sequence; and a storage module configured for storing the target image frame sequence.

Preferably, during the video communication, when an action that matches the target action in the preset set of actions appears multiple times and target image frames corresponding to the action that matches the target action are stored by the storage unit multiple times, as the video communication ends, the sequence generation module sequences the target image frames stored multiple times in terms of the acquiring time of the target image frames to which each action that matches the target action corresponds, so as to generate a target image frame sequence.

Preferably, the action detection unit analyzes a body image of at least one communicator in the video communication on basis of communication images acquired by an initiating terminal device of the video communication and communication images acquired by a called terminal device, so as to monitor a body action of the communicator in real time.

Preferably, the target image frame includes a first target image frame and a second target image frame;

the first target image frame is an image frame including an action of the communicator that matches the target action among communication images acquired by one of an initiating terminal device and a called terminal device; and the second target image frame is an image frame having the same acquiring time as the first target image frame among image frames acquired by the other of the initiating terminal device and the called terminal device.

Preferably, the electronic device is a terminal device, the action detection unit analyzes a body image of a communicator in the video communication on basis of communication images acquired by the terminal device, so as to monitor a body action of the communicator in real time.

Preferably, the electronic device is a terminal device, the action detection unit analyzes a body image of a communicator in the video communication on basis of communication images received by the terminal device from other terminal devices, so as to monitor a body action of the communicator in real time.

Preferably, the electronic device is a server, the action detection unit analyzes a body image of a communicator in the video communication on basis of communication images from a terminal device, so as to monitor an action of the communicator in real time.

Preferably, the storage unit is further configured for, when the video communication ends, storing a communication image frame sequence including communication images from start of the video communication to end thereof; and associating a communication image frame sequence for a video communication with a target image frame sequence stored for the video communication.

Preferably, the image acquisition unit further includes an information acquisition unit through which a first image is acquired;

the processing unit is further for determining whether the first image satisfies a preset condition, and generating a first label when the first image satisfies the preset condition; and the electronic device further comprises a first acquisition unit for acquiring first information that includes first association information indicating that the first label and the first object are associated.

Preferably, in the above electronic device, the first information further includes:

the first label, and/or first correspondence information that the first image and pre-stored data correspond.

Preferably, in the above electronic device, the first label includes:

the first image, or an image obtained after processing the first image, or pre-stored data to which the first image corresponds.

Preferably, the above electronic device further comprises:

a superimposition unit for simultaneously displaying the first label and the first object.

Preferably, the above electronic device further comprises: a storage unit for storing the first information.

Preferably, the above electronic device further comprises:

a communication unit for, in a communication state of the electronic device and a second electronic device, simultaneously displaying the first image on a second display unit of the second electronic device; and an information transmission unit for transmitting the first information to the second electronic device, displaying the first label on the second display unit on basis of the first information after the first information is received by the second electronic device.

Preferably, the above electronic device further comprises:

a second acquisition unit for acquiring second information of the second electronic device, wherein the second information includes second association information indicating that the second label and the first object are associated, and the second label is a label generated when the second image acquired by the second image acquisition unit of the second electronic device satisfies the preset condition.

Preferably, the above electronic device further comprises:

an execution unit for acquiring the second label through the second information, and meanwhile displaying the second label, wherein the second label includes the second image, or pre-stored data to which the second image corresponds.

With the solutions provided above by the embodiments of the present invention, during a video communication, images on a specific action of the user can be automatically cut and stored, so that after the video communication ends, the user can easily view splendid and natural image during the video communication without further processing.

Further, from the above technical solutions, it can be known that compared with the conventional technique, the data processing method provided by the embodiments of the present invention acquire the first image of the user through the image acquisition unit on the electronic device, if the acquired first image of the user satisfies a preset condition, the first image is generated into a label, which is associated with a first object, and finally first association information indicating that the first label and the first object are associated is obtained. The method provided by the embodiments of the present invention can automatically acquire the first image of the user through the image acquisition unit disposed on the electronic device, and associate the first label into which the first image is generated and the first object, so that the first image of the user can be acquired without manually entering feedback information by the user, and this image is also associated with the first image.

BRIEF DESCRIPTION OF THE DRAWINGS

In order to more clearly illustrate the technical solutions of the embodiments of the present invention, the accompanying drawings necessary for the description of the embodiments will be introduced briefly below. The accompanying drawings described below are merely exemplary embodiments of the present invention.

DETAILED DESCRIPTION

Figure 1:
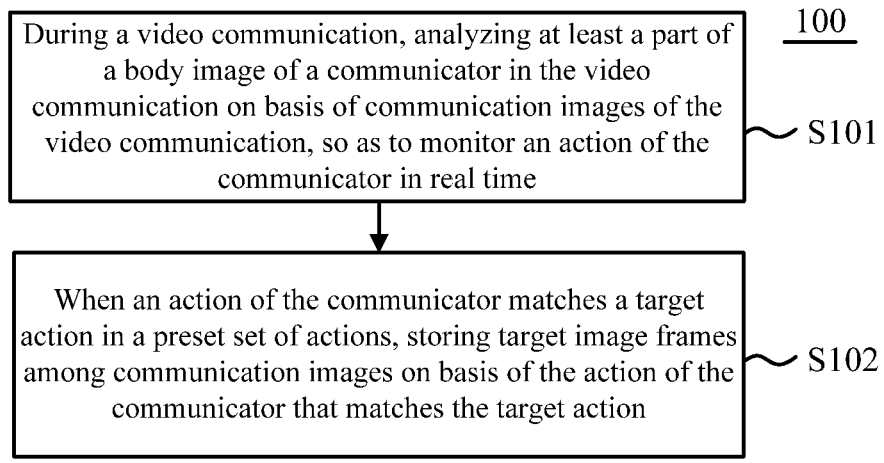
FIG. 1 is a flow chart illustrating a data processing method according to a first embodiment of the present invention.

Hereinafter, preferred embodiments of the present invention will be described in detail with reference to the accompanying drawings. Please note that, in this specification and the accompanying drawings, procedures and elements that are substantially the same are represented with the same reference numerals, and repeated explanations of these steps and elements will be omitted.

First Embodiment

The data processing method according to an embodiment of the present invention may be applied to a first electronic device having a first image acquisition unit and a first display unit, the method comprising:

acquiring a first image, determining whether the first image satisfies a preset condition, and executing a first predetermined processing when the first image satisfies the preset condition.

FIG. 1 is a flow chart illustrating a data processing method 100 according to an embodiment of the present invention. Hereinafter, the data processing method according to the embodiment of the present invention will be described with reference to FIG. 1. The data processing method 100 may be applied to the above electronic device.

As shown in FIG. 1, in the first embodiment, acquiring a first image, determining whether the first image satisfies a preset condition, and executing a first predetermined processing when the first image satisfies the preset condition comprises: in step S101, during a video communication, analyzing at least a part of a body image of a communicator in the video communication on basis of communication images of the video communication, so as to monitor an action of the communicator in real time. In this embodiment, the action of the communicator may be a body action of the communicator, which for example, may include actions of a trunk, limbs, a head and other parts. In step S101, a part of a body image of a communicator may be analyzed according to a preset. For example, when it is preset that the action of the communicator may be his/her head action, in step S101, the head image of the video communicator may be analyzed only. Further, according to an example of the present invention, the head action of the communicator may include a facial expression of the communicator.

According to an example of the present invention, the data processing method 100 may be applied to a terminal device. In this case, during a video communication, a body image of the communicator may be analyzed on basis of communication images obtained by the terminal device, so as to monitor the body action of the communicator in real time. For example, the communication images obtained by the terminal device may be communication images acquired by the terminal device. As another example, the communication images obtained by the terminal device may be communication images received by the terminal device from other terminal devices. Further, according to another example of the present invention, the data processing method 100 may be applied to a server. In this case, in step S101, during a video communication, a body image of the communicator in the video communication may be analyzed on basis of communication images from a terminal device that is performing the same video communication so as to monitor the body action of the communicator in real time.

Then, in step S102, when an action of the communicator matches a target action in a preset set of actions, target image frames among communication images are stored on basis of the action of the communicator that matches the target action. According to an example of the present invention, the target action may be a predetermined action, and the set of actions may include a plurality of predetermined actions. For example, the target action may be laughing, winking, pouting, hands up, and so on. In step S101, whether the communicator makes an action that is consistent with or close to a predetermined action can be determined by analyzing the body image of the communicator in the video communication on basis of communication images of the video communication. And when the communicator makes a predetermined action, it is determined in step S102 that the action of the communicator matches a target action in the preset set of actions.

However, it may be probably impossible for the preset actions to include all the actions that represent emotions of the user like excitement, happiness, anger etc. when performing video communication, that is to say, it is difficult to illustrate all of the preset actions. In addition, when the user is making a video communication, he/she may make an action that is hard to predict in advance to demonstrate his/her prevailing mood. In this case, if there are no predetermined standard actions that correspond to these actions representing specific emotions, images including these actions will not be stored, omission of key images representing user emotions may be caused.

In view of this, according to another example of the present invention, a target action is an action whose action range exceeds a predetermined threshold value as compared with a standard action, which is determined on basis of communication images during a predetermined time period from start of the video communication, with expression as example, a predetermined threshold value for a range of change of facial features may be determined in advance, and a standard expression of the communicator may be determined on basis of communication images during a predetermined time period from start of the video communication. For example, the standard expression of the communicator is determined by determining the status of the facial features of the communicator in a predetermined time period. In step S101, status parameters of the facial features of the communicator may be obtained by analyzing facial images of the communicator in the video communication on basis of communication images of the video communication, so as to determine whether an action of the communicator exceeds an action range. And when one or more actions of the facial features of the communicator exceed a predetermined threshold value, in step S102 it is determined that the action of the communication matches a target action in a preset set of actions. Accordingly, key image during the video communication can be effectively detected and stored without the need to set in advance the actions that represent specific emotions of the user one by one.

As described above, during a video communication, a body image of at least one communicator in the video communication can be analyzed on basis of one of communication images acquired by an initiating terminal device of the video communication and communication images acquired by a called terminal device, so as to monitor a body action of the communicator in real time. Alternatively, during a video communication, a body image of at least one communicator in the video communication can be analyzed on basis of both communication images acquired by an initiating terminal device of the video communication and communication images acquired by a called terminal device, so as to monitor a body action of the communicator in real time.

In the case of analyzing body image of at least one communicator in the video communication on basis of both communication images acquired by an initiating terminal device of the video communication and communication images acquired by a called terminal device, the target image frame may include a first target image frame and a second target image frame. Specifically, the first target image frame may be an image frame including an action of the communicator that matches the target action among communication images acquired by one of an initiating terminal device and a called terminal device. According to an example of the present invention, the second target image frame is an image frame having the same acquiring time as the first target image frame among image frames acquired by the other of the initiating terminal device and the called terminal device. Thereby, when one party of the communicators using the initiating terminal device and the called terminal device makes an action that matches a target action, an image frame including the action that matches the target action may be stored, and an image of the other party of the communicators at this moment may be stored, so as to display an action response of the other party of the communicators with regard to this target action. Preferably, as for the first target image frame and the second target image frame having the same acquiring time, they are stored in a manner that the first target image frame is arranged before the second target image frame.

However, when one party of the communicators using the initiating terminal device and the called terminal device makes an action that matches the target action, in some cases, the other party of the communicators may probably not respond to this action immediately, but instead responds with a slight delay than this action. In view of this, according to another example of the present invention, the second target image frame may be an image frame having an acquiring time that lags behind that of the first target image frame by a predetermined time amount among image frames acquired by the other of the initiating terminal device and the called terminal device.

In addition, according to another example of the present invention, the target image frames may be image frames among composite communication images generated from communication images acquired by the initiating terminal device and communication images acquired by the called terminal device during the video communication. For example, when the method 100 is applied to a terminal device, image frames that include communication images received by the terminal device and communication images acquired by the terminal device and displayed in a picture-in-picture effect are composed through a video communication application in the terminal device. In step S101, the image frames displayed in a picture-in-picture effect may be stored. When the method 100 is applied to a server, in step S102, storage may be made on basis of communication images acquired by the initiating terminal device and communication images acquired by the called terminal device during the video communication. Further, according to another example of the present invention, the target image frames may be partial images extracted from image frames of the communication image on basis of a target action. For example, when the target action is about an expression of the communicator, an image that includes the head of the communicator as extracted from image frames of the communication images may be taken as a target frame.

Further, according to another example of the present invention, in step S102, when the video communication ends, the target image frames may be sequenced on basis of acquiring time of the target image frames so as to generate a target image frame sequence, and then the target image frame sequence is stored. For example, the target image frames are a plurality of image frames within a predetermined time period which takes acquiring time of the image frame including the target action as a reference in the communication image.

Figure 2A:
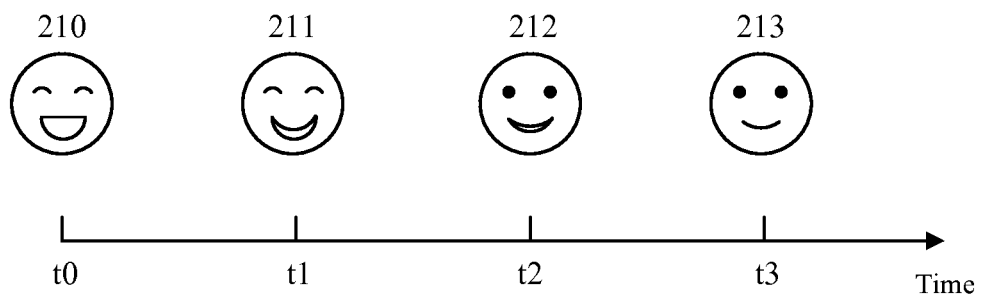
FIG. 2a is an explanatory diagram showing a target image frame sequence stored according to an example of the present invention.
Figure 2B:
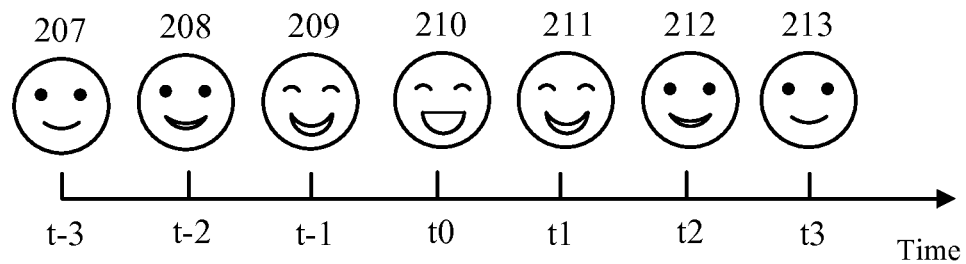
FIG. 2b is an explanatory diagram showing a target image frame sequence stored according to another example of the present invention.

FIG. 2a is an explanatory diagram showing a target image frame sequence stored according to an example of the present invention. FIG. 2b is an explanatory diagram showing a target image frame sequence stored according to another example of the present invention. In the examples shown in FIGS. 2a and 2b, the target action in the preset set of actions is laughing. In step S102, when the facial expression of the communicator matches laughing, as shown in FIG. 2a, a plurality of image frames 210-213 within a predetermined time period which takes the acquiring time of the image frame 210 including laughing as a start point are stored as target image frames sequence by the acquiring time. Alternatively, in step S102, when the facial expression of the communicator matches laughing, as shown in FIG. 2b, a plurality of image frames 207-213 within a predetermined time period which takes the acquiring time of the image frame 210 including laughing as a middle time point are stored as target image frames sequence by the acquiring time.

Figure 3:
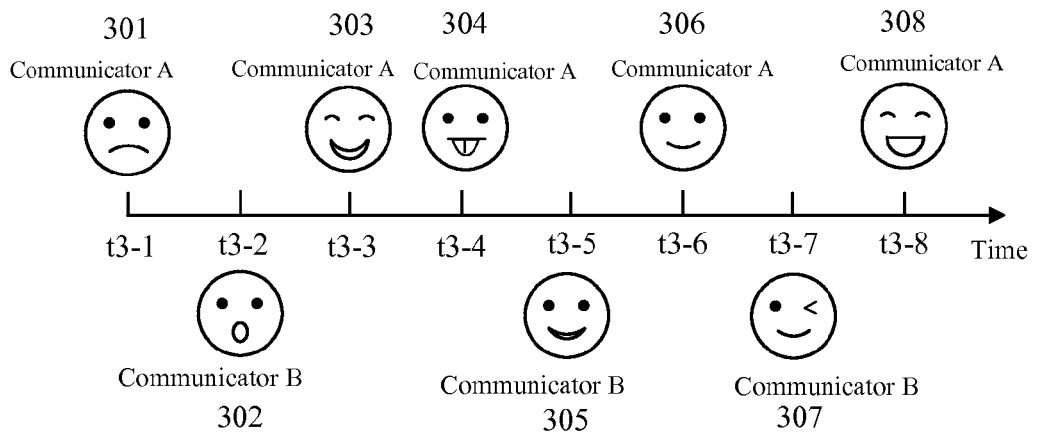
FIG. 3 is an explanatory diagram showing a target image frame sequence stored according to another example of the present invention.

As another example, during a video communication, when an action that matches the target action in the preset set of actions appears multiple times and target image frames corresponding to the action that matches the target action are stored multiple times, as the video communication ends, the target image frames stored multiple times are sequenced in terms of the acquiring time of the target image frames to which each action that matches the target action corresponds, so as to generate a target image frame sequence. FIG. 3 is an explanatory diagram showing a target image frame sequence stored according to another example of the present invention. In the example shown in FIG. 3, body images of the communicator A and the communicator B during the video communication are analyzed on basis of both communication images acquired by the initiating terminal device of the video communication and communication images acquired by the called terminal device. As shown in FIG. 3, when the video communication ends, the target image frames 301-310 stored multiple times for the actions of the communicator A and the communicator B are sequenced in terms of the acquiring time of the target image frames corresponding to the target action in the set of actions for the communicator A and the communicator B, so as to generate a target image sequence. In an alternative example, it is possible to, only according to the communication images on the communicator A, analyze the body image of the communicator A during the video communication, so as to monitor the body action of the communicator A in real time. And when the video communication ends, the stored target image frames on the communicator A are sequenced in terms of the acquiring time of the target image frames stored multiple times for the action of the communicator A that matches the target action in the set of actions. Further, in another alternative example, it is possible to, only according to the communication images on the communicator B, analyze the body image of the communicator B during the video communication, so as to monitor the body action of the communicator B in real time. And when the video communication ends, the stored target image frames on the communicator B are sequenced in terms of the acquiring time of the target image frames stored for the action of the communicator B that matches the target action in the set of actions.

With the solutions provided above by the embodiments of the present invention, during a video communication, image about a specific action of the user can be automatically cut and stored, so that after the video communication ends, the user can easily view splendid and natural image during the video communication without further processing.

In addition, according to another example of the present invention, when the method 100 in FIG. 1 is applied to a terminal device and it is detected that the action of the communicator matches the preset body action, the method shown in FIG. 1 may also comprises transmitting an image storage instruction to other terminal devices that are performing video communication with this terminal device, to cause the other terminal devices to store the image frames in communication images acquired by the other terminal devices according to the image acquisition instruction. Further, when the method 100 in FIG. 1 is applied to a server device and it is detected that the action of the communicator matches the preset body action, the method shown in FIG. 1 may also comprise transmitting an image storage instruction to all of the terminal devices that are performing video communication, to cause all of the terminal devices to store the image frames in communication images acquired by them according to the image acquisition instruction.

Further, according to another example of the present invention, the method shown in FIG. 1 may further comprise when the video communication ends, storing a communication image frame sequence including communication images from start of the video communication to end thereof. Preferably, the communication image frame sequence for a video communication is associated with a target image frame sequence stored in step S102 for this video communication, thereby as for a video communication, the user can conveniently view detailed contents when performing the video communication, and also quickly view key image frames during the video communication.

According to an example of the present invention, when the user selects to view a communication image frame sequence of a video communication, after playing the communication image frame sequence, a target image frame sequence associated with this communication image frame sequence can be played automatically. Further, according to an example of the present invention, a target image frame sequence of a video communication may be displayed as a preview screen of the video communication, so as to facilitate the user selecting the communication image frame sequence associated with the target image frame sequence on basis of the preview screen, so as to further view details of the video communication.

Figure 4:
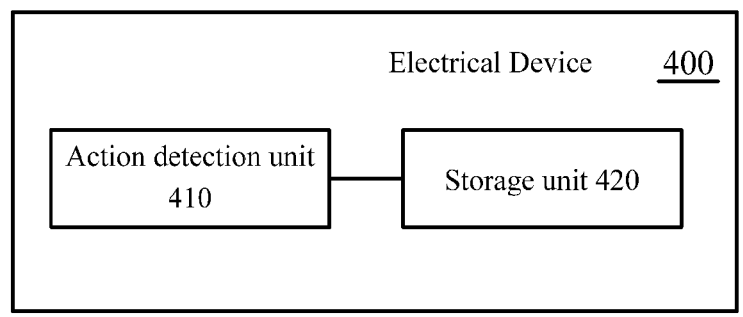
FIG. 4 is an exemplary structure block diagram illustrating an electronic device according to the first embodiment of the present invention.

Hereinafter, an electronic device according to an embodiment of the present invention will be illustrated with reference to FIG. 4. FIG. 4 is an exemplary structure block diagram illustrating an electronic device 400 according to the first embodiment of the present invention. As shown in FIG. 4, the electronic device 400 in this embodiment comprises an action detection unit 410 and a storage unit 420. Respective modules of the electronic device 400 execute the respective steps/functions in the data processing method 100 in FIG. 1. Therefore, for the simplicity of description, only the main structure of the electronic device 400 is described below, details are omitted.

For example, the action detection unit 410 can during a video communication, analyze at least a part of a body image of a communicator in the video communication based on communication images of the video communication, so as to monitor an action of the communicator in real time. In this embodiment, the action of the communicator may be a body action of the communicator, which for example, may include actions of a trunk, limbs, a head and other parts. In step S101, a part of a body image of a communicator may be analyzed according to a preset. For example, when it is preset that the action of the communicator may be his/her head action, in step S101, the head image of the video communicator may be analyzed only. Further, according to an example of the present invention, the head action of the communicator may include a facial expression of the communicator.

According to an example of the present invention, the electronic device 400 may be a terminal device. In this case, during a video communication, the action detection unit 410 can analyze a body image of the communicator on basis of communication images obtained by the terminal device, so as to monitor the body action of the communicator in real time. For example, the communication images obtained by the terminal device may be communication images acquired by the terminal device. As another example, the communication images obtained by the terminal device may be communication images received by the terminal device from other terminal devices. Further, according to another example of the present invention, the electronic device may be a server. In this case, during a video communication, the action detection unit 410 can analyze a body image of the communicator in the video communication on basis of communication images from a terminal device that is performing the same video communication so as to monitor the body action of the communicator in real time.

Then, when an action of the communicator matches a target action in a preset set of actions, the storage unit 420 can store target image frames among communication images on basis of the action of the communicator that matches the target action. According to an example of the present invention, the target action may be a predetermined action, and the set of actions may include a plurality of predetermined actions. For example, the target action may be laughing, winking, pouting, hands up, and so on. The action detection unit 410 can determine whether the communicator makes an action that is consistent with or close to a predetermined action by analyzing the body image of the communicator in the video communication on basis of communication images of the video communication. And when the communicator makes a predetermined action, the storage unit 420 determines that the action of the communicator matches a target action in the preset set of actions.

However, it may be probably impossible for the preset actions to include all the actions that represent emotions of the user like excitement, happiness, anger etc. when performing video communication, that is to say, it is difficult to illustrate all of the preset actions. In addition, when the user is making a video communication, he/she may make an action that is hard to predict in advance to demonstrate his/her prevailing mood. In this case, if there are no predetermined standard actions that correspond to these actions representing specific emotions, images including these actions will not be stored, omission of key images representing user emotions may be caused.

In view of this, according to another example of the present invention, a target action is an action whose action range exceeds a predetermined threshold value as compared with a standard action, which is determined on basis of communication images during a predetermined time period from start of the video communication, with expression as example, a predetermined threshold value for a range of change of facial features may be determined in advance, and a standard expression of the communicator may be determined on basis of communication images during a predetermined time period from start of the video communication. For example, the standard expression of the communicator is determined by determining the status of the facial features of the communicator in a predetermined time period. The action detection unit 410 can obtain status parameters of the facial features of the communicator by analyzing facial images of the communicator in the video communication on basis of communication images of the video communication, so as to determine whether an action of the communicator exceeds an action range. And when one or more actions of the facial features of the communicator exceed a predetermined threshold value, the storage unit 420 determines that the action of the communication matches a target action in a preset set of actions. Accordingly, key image during the video communication can be effectively detected and stored without the need to set in advance the actions that represent specific emotions of the user one by one.

As described above, during a video communication, the action detection unit 410 can analyze a body image of at least one communicator in the video communication on basis of one of communication images acquired by an initiating terminal device of the video communication and communication images acquired by a called terminal device, so as to monitor a body action of the communicator in real time. Alternatively, during a video communication, the action detection unit 410 can analyze a body image of at least one communicator in the video communication on basis of both communication images acquired by an initiating terminal device of the video communication and communication images acquired by a called terminal device, so as to monitor a body action of the communicator in real time.

In the case that the action detection unit 410 analyzes body image of at least one communicator in the video communication on basis of both communication images acquired by an initiating terminal device of the video communication and communication images acquired by a called terminal device, the target image frame may include a first target image frame and a second target image frame. Specifically, the first target image frame may be an image frame including an action of the communicator that matches the target action among communication images acquired by one of an initiating terminal device and a called terminal device.

According to an example of the present invention, the second target image frame is an image frame having the same acquiring time as the first target image frame among image frames acquired by the other of the initiating terminal device and the called terminal device. Thereby, when one party of the communicators using the initiating terminal device and the called terminal device makes an action that matches a target action, an image frame including the action that matches the target action may be stored, and an image of the other party of the communicators at this moment may be stored, so as to display an action response of the other party of the communicators with regard to this target action. Preferably, as for the first target image frame and the second target image frame having the same acquiring time, they are stored in a manner that the first target image frame is arranged before the second target image frame.

However, when one party of the communicators using the initiating terminal device and the called terminal device makes an action that matches the target action, in some cases, the other party of the communicators may probably not respond to this action immediately, but instead responds with a slight delay than this action. In view of this, according to another example of the present invention, the second target image frame may be an image frame having an acquiring time that lags behind that of the first target image frame by a predetermined time amount among image frames acquired by the other of the initiating terminal device and the called terminal device.

In addition, according to another example of the present invention, the target image frames may be image frames among composite communication images generated from communication images acquired by the initiating terminal device and communication images acquired by the called terminal device during the video communication. For example, when the electronic device is a terminal device, image frames that include communication images received by the terminal device and communication images acquired by the terminal device and displayed in a picture-in-picture effect are composed through a video communication application in the terminal device. The storage unit 420 can store the image frame that is displayed in a picture-in-picture effect. When the electronic device 400 a server, the storage unit 420 can store on basis of communication images acquired by the initiating terminal device and communication images acquired by the called terminal device during the video communication.

Further, according to another example of the present invention, the target image frames may be partial images extracted from image frames of the communication image on basis of a target action. For example, when the target action is about an expression of the communicator, an image that includes the head of the communicator as extracted from image frames of the communication images may be taken as a target frame.

Figure 5:
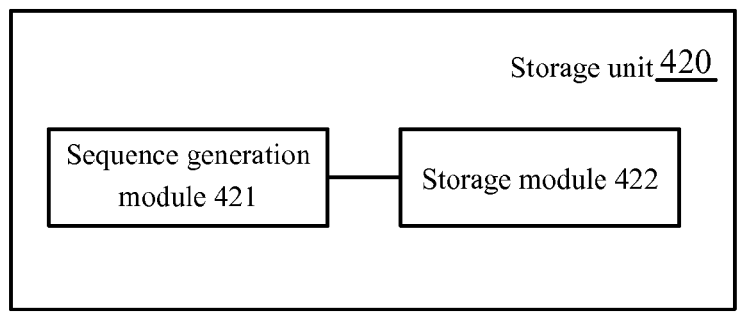
FIG. 5 is an exemplary structure block diagram illustrating a storage unit of the electronic device according to the first embodiment of the present invention.

FIG. 5 is an exemplary structure block diagram illustrating the storage unit of the electronic device according to the embodiment of the present invention. As shown in FIG. 5, according to an example of the present invention, the storage unit 420 may include a sequence generation module 421 and a storage module 422. In particular, the sequence generation module 421 can sequence the target image frames on basis of acquiring time of the target image frames when the video communication ends, so as to generate a target image frame sequence, and then the storage module 422 can store the target image frame sequence. For example, when the action of the communicator matches the target action in the preset set of actions, the sequence generation module 421 can determine a plurality of image frames within a predetermined time period which takes acquiring time of the image frame including the target action as a reference in the communication image as the target image frames.

As another example, during a video communication, when an action that matches the target action in the preset set of actions appears multiple times, and target image frames corresponding to the action that matches the target action are stored multiple times, as the video communication ends, the sequence generation module 421 sequences the target image frames stored multiple times in terms of the acquiring time of the target image frames to which each action that matches the target action corresponds, so as to generate a target image frame sequence. In particular, the action detection unit 410 can analyze the body images of the two communicators during the video communication on basis of both communication images acquired by the initiating terminal device of the video communication and communication images acquired by the called terminal device, so as to monitor the body actions of the two communicators in real time. In this case, when the video communication ends, the sequence generation module 421 sequences the target image frames stored multiple times for the actions of the two communicators in terms of the acquiring time of the target image frames corresponding to the target action in the set of actions for the two communicators, so as to generate a target image frame sequence. In an alternative example, it is possible for the action detection unit 410 to, only according to the communication images on one communicator, analyze the body image of one communicator in the video communication, so as to monitor the body action of one communicator in real time. And when the video communication ends, the sequence generation module 421 can sequence the stored target image frames on the communicator A in terms of the acquiring time of the target image frames stored multiple times for the action of the communicator A that matches the target action in the set of actions.

With the solutions provided above by the embodiments of the present invention, during a video communication, image about a specific action of the user can be automatically cut and stored, so that after the video communication ends, the user can easily view splendid and natural image during the video communication without further processing.

Further, according to another example of the present invention, the device shown in FIG. 4 may also include a transmission unit for transmitting an image storage instruction to other terminal devices that are performing video communication with this terminal device, to cause the other terminal devices to store the image frames in communication images acquired by the other terminal devices according to the image acquisition instruction.

Further, according to another example of the present invention, the storage unit 420 also can, when the video communication ends, store a communication image frame sequence including communication images from start of the video communication to end thereof. Preferably, the communication image frame sequence for a video communication is associated with a target image frame sequence stored in the storage unit 420 for this video communication, thereby as for a video communication, the user can conveniently view detailed contents when performing the video communication, and also quickly view key image frames during the video communication.

Second Embodiment

Figure 6:
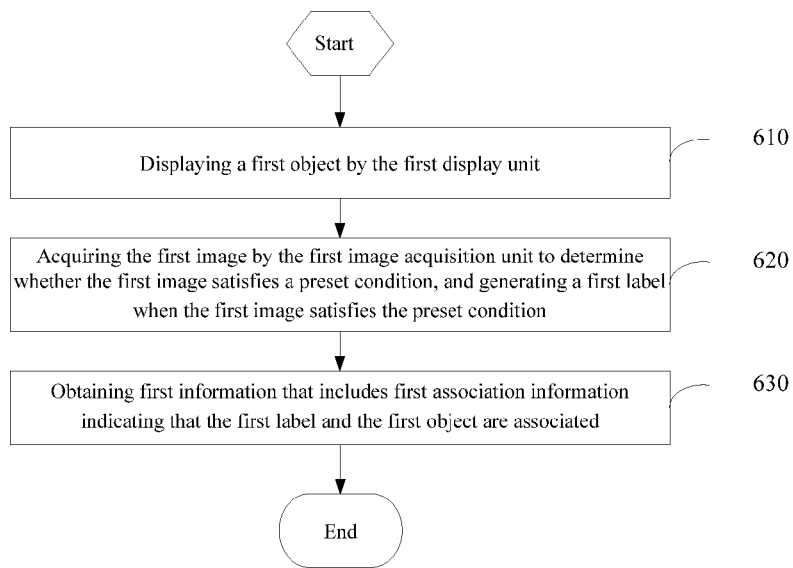
FIG. 6 is a schematic flow chart of a data processing method according to a second embodiment of the present invention.

FIG. 6 is a schematic flow chart of a data processing method according to a second embodiment of the present invention. Hereinafter, a data processing method according to the embodiment of the present invention will be described with reference to FIG. 6. The data processing method 600 may be applied to a first electronic device having a first image acquisition unit and a first display unit.

As shown in FIG. 6, in the second embodiment, acquiring a first image, determining whether the first image satisfies a preset condition, and executing a first predetermined processing when the first image satisfies the preset condition comprises:

Step 610: displaying a first object by the first display unit;

Step 620: acquiring the first image by the first image acquisition unit to determine whether the first image satisfies a preset condition, and generating a first label when the first image satisfies the preset condition; and Step 630: obtaining first information that includes first association information indicating that the first label and the first object are associated.

The data processing method provided by the embodiments of the present invention acquire the first image of the user through the image acquisition unit on the electronic device, if the acquired first image of the user satisfies a preset condition, the first image is generated into a label, which is associated with a first object, and finally first association information indicating that the first label and the first object are associated is obtained. The method provided by the embodiments of the present invention can automatically acquire the first image of the user through the image acquisition unit disposed on the electronic device, and associate the first label into which the first image is generated and the first object, so that the first image of the user can be acquired without manually entering feedback information by the user, and this image is also associated with the first image.

Figure 7:
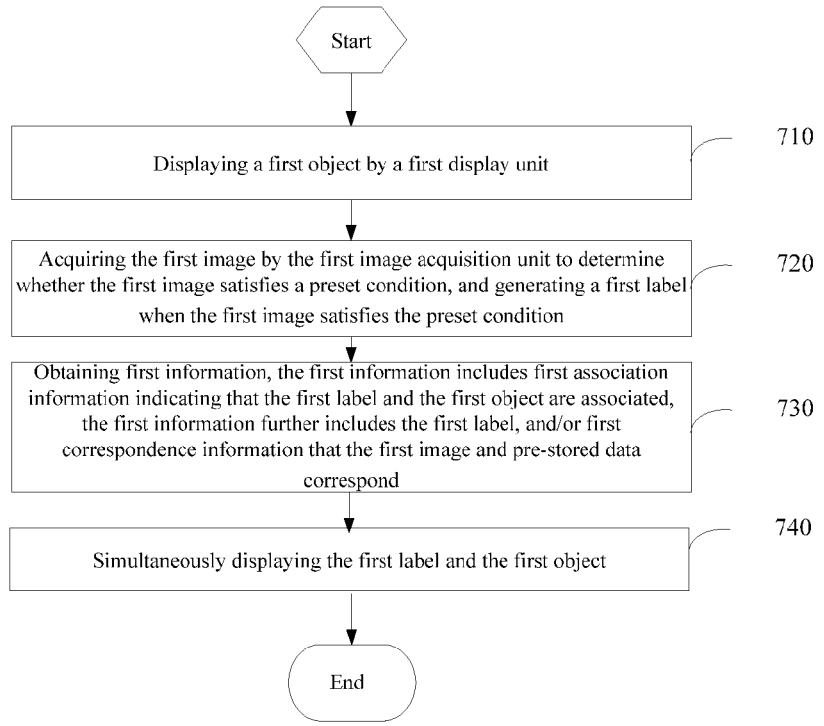
FIG. 7 is another schematic flow chart of the data processing method according to the second embodiment of the present invention.

Referring to FIG. 7, the embodiment of the present invention provides a data processing method applied to a first electronic device having a first image acquisition unit and a first display unit, the first electronic device may be a phone, a pad, a notebook, or other electronic devices, the first display unit may be a touch screen or a display screen on the electronic device, the first image acquisition unit may be a camera on the electronic device, the method comprises:

Step 710: displaying a first object by a first display unit.

The first object may be contents like picture, music, video, text, etc. displayed on the electronic device. Further, the first object may be contents like picture, music, video, text, etc. on a program that is in a running state of the first electronic device, for example, a plurality of running windows are being opened on the first electronic device, and the first object is the topmost window among the plurality of running windows.

Step 720: acquiring the first image by the first image acquisition unit to determine whether the first image satisfies a preset condition, and generating a first label when the first image satisfies the preset condition.

The above first image is the user's character image, and further, the facial image of the user. Obtaining the facial image may include converting the first image into a black and white picture, reading a brightness value of each point on the black and white picture, and cutting a face region in the first image through the aforesaid brightness value and a basic outline of the face.

Whether the first image satisfies a preset condition is determined, the preset condition may include a similarity of image of mouth corners or a similarity of image of eyes, when certain features of the facial image reach the similarity of image of mouth corners or the similarity of image of eyes, then the facial image is a smiling face. When the predetermined condition is the similarity of image of mouth corners as described above, a lips image in the face region can be cut through the above brightness value, similarity of the cut lips image with the preset lips image of a smiling face as stored are compared, so as to arrive at a percentage value, it is judged whether the percentage value is greater than a preset value, if it is greater than the preset set, then the obtained first image meets a smiling facial image, and a first image is generated into a first label, the generated first label may include the first image, or an image obtained after processing the first image, or pre-stored data to which the first image corresponds. If the generated first label is the first image, it is not necessary to perform any processing on the first image; the first label may be an image obtained after processing the first image, for example, beautification may be made on the first image, the first label is the beautified first image; in addition, the first image may also be pre-stored data that the first image corresponds, for example, when the first image is a smiling face, the first label may be a smiling face LOGO stored in advance in the electronic device, which may be a dynamic or a static image.

Step 730: obtaining first information.

The first information includes first association information indicating that the first label and the first object are associated, the first information further includes the first label, and/or first correspondence information that the first image and pre-stored data correspond.

The first label is user feedback information for the first object and has a unique correspondence with the first object, the first association information is for indicating the unique correspondence between the first label and the first object; the first information further includes a first label, which may be the first image, or an image obtained after processing the first image, or pre-stored data to which the first image corresponds as described above; the first information may also include first correspondence information that the first image and pre-stored data correspond, the pre-stored data may be a still or a dynamic image corresponding to the first image, for example, when the first image is a smiling facial image, the pre-stored data is a smiling picture LOGO stored in advance in the first electronic device, the smiling picture LOGO and the smiling facial image have first correspondence information stored in the first information.

Step 740: simultaneously displaying the first label and the first object.

The first label and the first object may be simultaneously displayed on the first display unit, for example, the first label may be superimposed on the first object, the first label superimposed on the first object is simultaneously displayed while displaying the first object, or the first label may be displayed at one side of the first object; further, the first label may be superimposed on the first object or displayed on one side of the first object in the form of icon, when clicking the icon, the first label is displayed.

Further, in other embodiments of the present invention, the first information may also be stored, and the above label may also be stored. The first information and the first label are stored, if the first object is displayed again, the first information associated with the first object can be quickly fed back and the first label can be quickly displayed.

The data processing method provided by the embodiments of the present invention acquire the first image of the user through the image acquisition unit on the electronic device, if the acquired first image of the user satisfies a preset condition, the first image is generated into a label, which is associated with a first object, and finally first association information indicating that the first label and the first object are associated is obtained. The method provided by the embodiments of the present invention can automatically acquire the first image of the user through the image acquisition unit disposed on the electronic device, and associate the first label into which the first image is generated and the first object, so that the first image of the user can be acquired without manually entering feedback information by the user, and this image is also associated with the first image.

Further, the above first image may be an image of the user's face, when the facial image satisfies a preset condition, label information generated for the facial image can be displayed simultaneously with the first object, so that the user can also simultaneously view the corresponding label information of the first object when viewing the first object, for example, when the first object is a picture and the first label is a smiling facial image, the smiling picture can be displayed on a desktop together with the picture.

Figure 8:
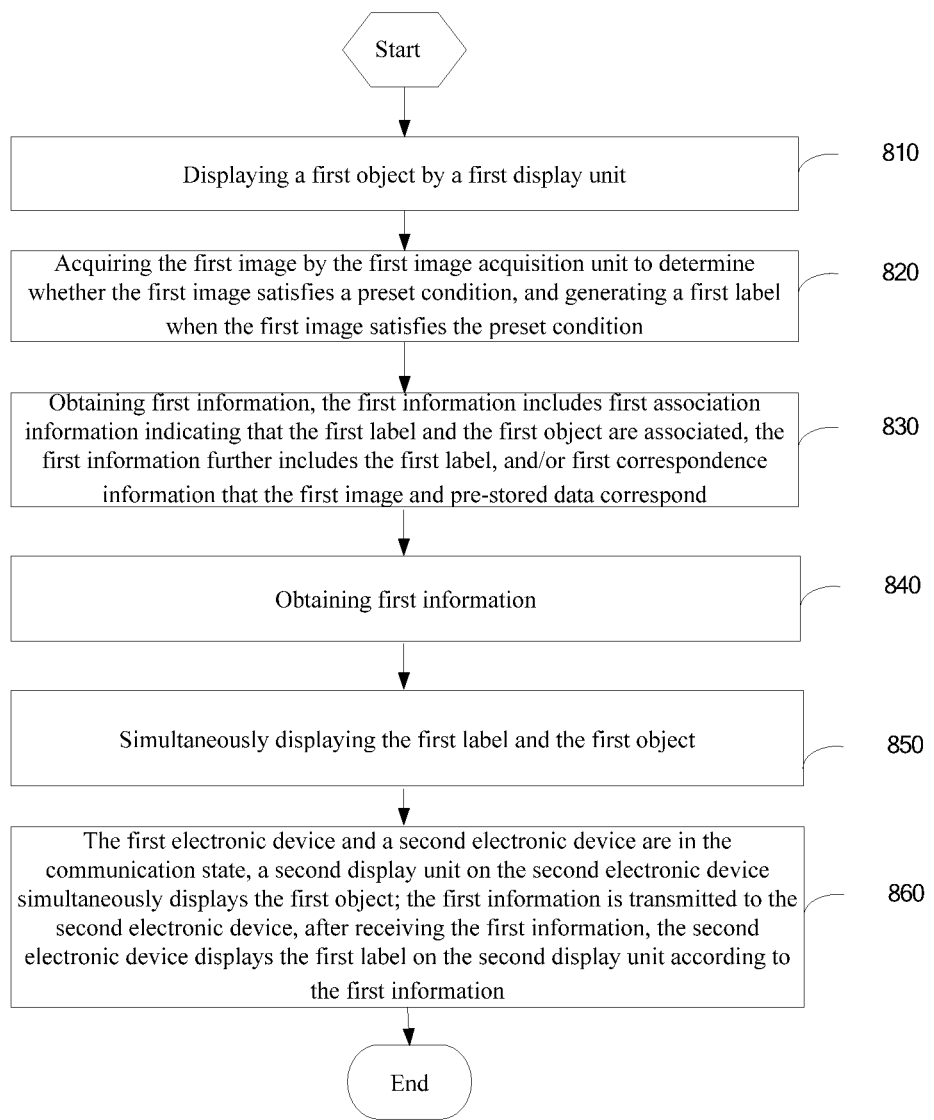
FIG. 8 is another schematic flow chart of the data processing method according to the second embodiment of the present invention.

Referring to FIG. 8, the embodiment of the present invention provides a data processing method applied to a first electronic device having a first image acquisition unit and a first display unit, the method comprises:

Step 810: displaying a first object by a first display unit.

The first object may be contents like picture, music, video, text, etc. displayed on the electronic device. Further, the first object may be contents like picture, music, video, text, etc. on a program that is in a running state of the first electronic device, for example, a plurality of running windows are being opened on the first electronic device, and the first object is the topmost window among the plurality of running windows.

Step 820: acquiring the first image by the first image acquisition unit to determine whether the first image satisfies a preset condition, and generating a first label when the first image satisfies the preset condition.

The above first image is the user's character image, and further, the facial image of the user. Obtaining the facial image may include converting the first image into a black and white picture, reading a brightness value of each point on the black and white picture, and cutting a face region in the first image through the aforesaid brightness value and a basic outline of the face.

Whether the first image satisfies a preset condition is determined, the preset condition may include a similarity of image of mouth corners or a similarity of image of eyes, when certain features of the facial image reach the similarity of image of mouth corners or the similarity of image of eyes, then the facial image is a smiling face. When the predetermined condition is the similarity of image of mouth corners as described above, a lips image in the face region can be cut through the above brightness value, similarity of the cut lips image with the preset lips image of a smiling face as stored are compared, so as to arrive at a percentage value, it is judged whether the percentage value is greater than a preset value, if it is greater than the preset set, then the obtained first image meets a smiling facial image, and a first image is generated into a first label, the generated first label may include the first image, or an image obtained after processing the first image, or pre-stored data to which the first image corresponds. If the generated first label is the first image, it is not necessary to perform any processing on the first image; the first label may be an image obtained after processing the first image, for example, beautification may be made on the first image, the first label is the beautified first image; in addition, the first image may also be pre-stored data that the first image corresponds, for example, when the first image is a smiling face, the first label may be a smiling face LOGO stored in advance in the electronic device, which may be a dynamic or a static image.

Step 830: obtaining first information.

The first information includes first association information indicating that the first label and the first object are associated, the first information further includes the first label, and/or first correspondence information that the first image and pre-stored data correspond.

The first label is user feedback information for the first object and has a unique correspondence with the first object, the first association information is for indicating the unique correspondence between the first label and the first object; the first information further includes a first label, which may be the first image, or an image obtained after processing the first image, or pre-stored data to which the first image corresponds as described above; the first information may also include first correspondence information that the first image and pre-stored data correspond, the pre-stored data may be a still or a dynamic image corresponding to the first image, for example, when the first image is a smiling facial image, the pre-stored data is a smiling picture LOGO stored in advance in the first electronic device, the smiling picture LOGO and the smiling facial image have first correspondence information stored in the first information.

Step 840: simultaneously displaying the first label and the first object.

The first label and the first object may be simultaneously displayed on the first display unit, for example, the first label may be superimposed on the first object, the first label superimposed on the first object is simultaneously displayed while displaying the first object, or the first label may be displayed at one side of the first object; further, the first label may be superimposed on the first object or displayed on one side of the first object in the form of icon, when clicking the icon, the first label is displayed.

Further, in other embodiments of the present invention, the first information may also be stored, and the above label may also be stored. The first information and the first label are stored, if the first object is displayed again, the first information associated with the first object can be quickly fed back and the first label can be quickly displayed.

Step 850: the first electronic device and a second electronic device are in the communication state, a second display unit on the second electronic device simultaneously displays the first object; the first information is transmitted to the second electronic device, after receiving the first information, the second electronic device displays the first label on the second display unit according to the first information.

The first electronic device can communicate with another electronic device (the second electronic device), wherein the second electronic device may be a phone, a pad, a notebook, or other electronic device, the first display unit may be a touch screen or a display screen.

When the first electronic device and the second electronic device are in a communication state, the first object may be displayed simultaneously on the two electronic devices, for example, when the first electronic device and the second electronic device both are being on a video communication using a video communication software, a first object like a picture may be displayed simultaneously on video call windows on the two electronic devices, this picture may be transmitted from the second electronic device to the first electronic device and received by the first electronic device. The first electronic device transmits the first information to the second electronic device, and the second electronic device displays the first label on the second display unit according to the first information after receiving the first information.

Further, the second electronic device can simultaneously display the first label and the first object on the second display screen according to the first association information in the first information, or display the first label on the first object that has already been displayed on the second display unit on basis of the first label in the first information, or obtain pre-stored data to which the first image corresponds on basis of the first correspondence information that the first image and the pre-store data correspond in the first information and display the pre-stored data on the second electronic device, or directly display the obtained pre-stored data to which the first image corresponds in the first information on the second display unit.

The data processing method provided by the embodiments of the present invention acquire the first image of the user through the image acquisition unit on the electronic device, if the acquired first image of the user satisfies a preset condition, the first image is generated into a label, which is associated with a first object, and finally first association information indicating that the first label and the first object are associated is obtained. The method provided by the embodiments of the present invention can automatically acquire the first image of the user through the image acquisition unit disposed on the electronic device, and associate the first label into which the first image is generated and the first object, so that the first image of the user can be acquired without manually entering feedback information by the user, and this image is also associated with the first image.

Further, the above first image may be an image of the user's face, when the facial image satisfies a preset condition, label information generated for the facial image can be displayed simultaneously with the first object, so that the user can also simultaneously view the corresponding label information of the first object when viewing the first object, for example, when the first object is a picture and the first label is a smiling facial image, the smiling picture can be displayed on a desktop together with the picture.

Further, the first electronic device of the present invention can communicate with other electronic devices, on which the first object and the first label corresponding to the first object can be displayed simultaneously with the first electronic device, so that the users of the two electronic device terminals can simultaneously share the first object and the corresponding label on the first electronic device.

Figure 9:
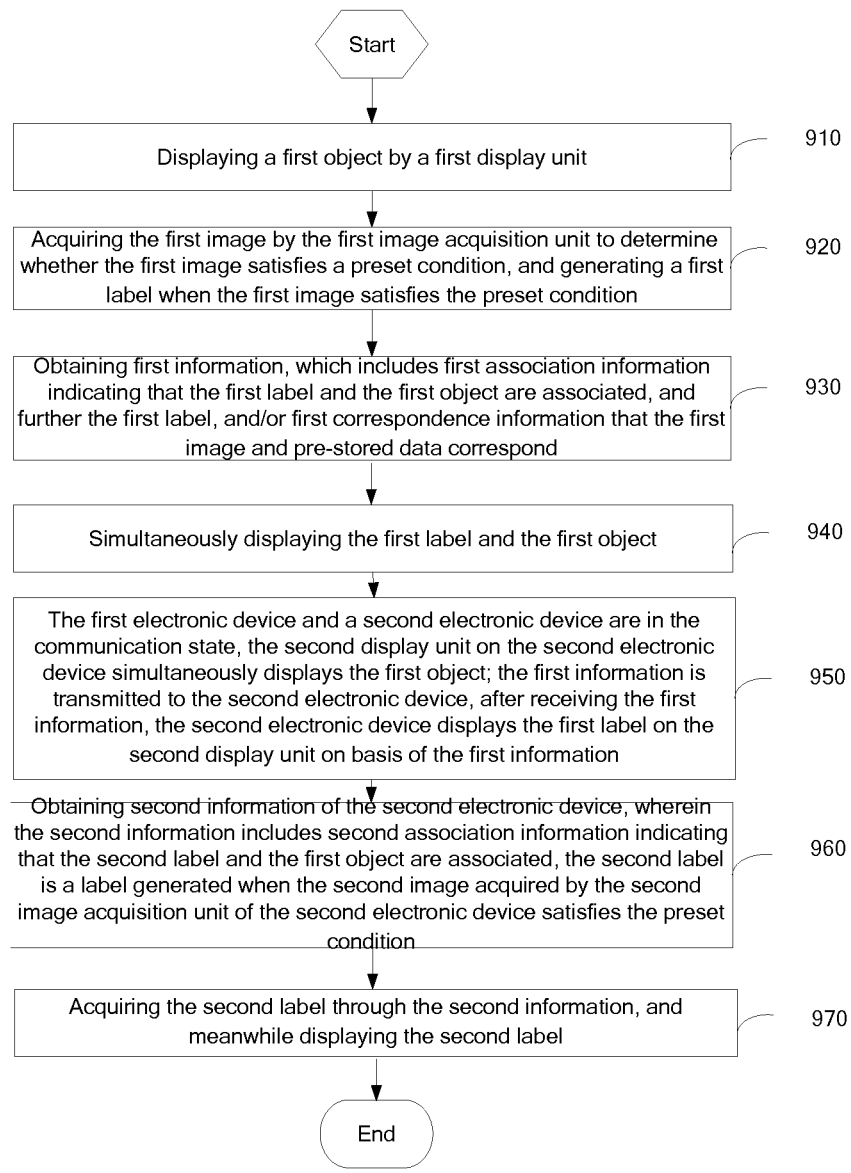
FIG. 9 is another schematic flow chart of the data processing method according to the second embodiment of the present invention.

Referring to FIG. 9, the embodiment of the present invention provides a data processing method applied to a first electronic device having a first image acquisition unit and a first display unit, the method comprises:

Step 910: displaying a first object by a first display unit.

Step 920: acquiring the first image by the first image acquisition unit to determine whether the first image satisfies a preset condition, and generating a first label when the first image satisfies the preset condition.

The first label includes the first image, or an image obtained after processing the first image, or pre-stored data to which the first image corresponds.

Step 930: obtaining first information, which includes first association information indicating that the first label and the first object are associated, and further the first label, and/or first correspondence information that the first image and pre-stored data correspond.

Step 940: simultaneously displaying the first label and the first object.

Step 950: the first electronic device and a second electronic device are in the communication state, the second display unit on the second electronic device simultaneously displays the first object; the first information is transmitted to the second electronic device, after receiving the first information, the second electronic device displays the first label on the second display unit on basis of the first information.

Steps 910-950 are similar to steps 810-850, refer to the process of the above-described embodiments, no details are repeated herein.

Step 960: obtaining second information of the second electronic device, wherein the second information includes second association information indicating that the second label and the first object are associated, the second label is a label generated when the second image acquired by the second image acquisition unit of the second electronic device satisfies the preset condition.

Step 970: acquiring the second label through the second information, and meanwhile displaying the second label.

The second label includes the second image, or pre-stored data to which the second image corresponds, and further, the second label and the second information are stored, so as to facilitate quickly feeding back the second information associated with the first object and displaying the second label when the first object is displayed again.

The second information and the second label of the second electronic device are similar to the first information and the second label of the first electronic device, no details are repeated herein. With the technical solution provided by the embodiment of the present invention, the first electronic device can acquire the second label on the second electronic device, which may be the image of the user in front of the second electronic device as acquired, or the pre-stored data to which the user image corresponds, the second label may be displayed simultaneously on the first object on the first electronic device and the first object on the second electronic device, in combination with the above embodiment, the first label may be also displayed simultaneously on the first object on the first electronic device and the first object on the second electronic device, thus when the users in front of the first electronic device and the second electronic device are simultaneously viewing the first object such as a picture on their own devices, inner resonance as love or disgust of the users in front of the two devices about the picture can be acquired by the image acquisition unit, and the direct inner resonance of the two users can be displayed on the two devices. Mistaken operations caused by that the users manually input picture identifiers like "Support", "Praise", "Red heart" etc. can be avoided.

Figure 10:
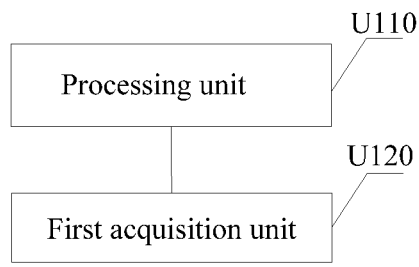
FIG. 10 is a schematic structural diagram of an electronic device according to the second embodiment of the present invention.

Referring to FIG. 10, an embodiment of the present invention provides an electronic device having a first image acquisition unit through which a first image is acquired, a first display unit that displays a first object, the electronic device further comprises:

a processing unit U 110, for determining whether the first image satisfies a preset condition, and generating a first label when the first image satisfies the preset condition; and a first acquisition unit U 120 for acquiring first information from the user, the first information includes first association information indicating that the first label and the first object are associated.

The data processing method provided by the embodiments of the present invention acquire the first image of the user through the image acquisition unit on the electronic device, if the acquired first image of the user satisfies a preset condition, the first image is generated into a label, which is associated with a first object, and finally first association information indicating that the first label and the first object are associated is obtained. The method provided by the embodiments of the present invention can automatically acquire the first image of the user through the image acquisition unit disposed on the electronic device, and associate the first label into which the first image is generated and the first object, so that the first image of the user can be acquired without manually entering feedback information by the user, and this image is also associated with the first image.

Further, in other embodiments of the present invention, the first information further includes:

the first label, and/or first correspondence information that the first image and pre-stored data correspond.

Further, in other embodiments of the present invention, the first label includes:

the first image, or an image obtained after processing the first image, or pre-stored data to which the first image corresponds.

Further, in other embodiments of the present invention, the electronic device further comprises:

a superimposition unit for simultaneously displaying the first object and the first label.

Further, in other embodiments of the present invention, the electronic device further comprising: a storage unit for storing the first information.

Further, in other embodiments of the present invention, the electronic device further comprising:

a communication unit for simultaneously displaying the first object by a second display unit on a second electronic device when the first electronic device and a second electronic device are in a communication state; and an information transmission unit for transmitting the first information to the second electronic device, displaying the first label on the second display unit on basis of the first information after the first information is received by the second electronic device.

Further, in other embodiments of the present invention, the electronic device further comprises:

a second acquisition unit for acquiring second information of the second electronic device, wherein the second information includes second association information indicating that the second label and the first object are associated, and the second label is a label generated when the second image acquired by the second image acquisition unit of the second electronic device satisfies the preset condition.

Further, in other embodiments of the present invention, the electronic device further comprises:

an execution unit for acquiring the second label through the second information, and meanwhile displaying the second label, wherein the second label includes the second image, or pre-stored data to which the second image corresponds.

Various embodiments in the specification are described by a progressive way, and each embodiment emphasizes on its differences than the other embodiments, the same or similar portions between the respective embodiments can be referred mutually. Since the device disclosed in the embodiments corresponds to the method disclosed therein, it is described relatively simple, please see the method parts for relevant descriptions.

A person with ordinary skill in the art can appreciate that units and algorithm steps in the examples described with reference to the embodiments in this text may be implemented through electronic hardware, computer software, or a combination of the two. And the software module may be placed on computer storage media in any form. To clearly illustrate the interchangeability of hardware and software, compositions and functions of the respective examples are described generally in terms of functions in the above. These functions are to be performed by hardware or software depends upon the particular applications and design constraints of technical solutions. As for each specific application, a person skilled in the art can use different methods to implement the described functions, but such implementations should not be construed as beyond the scope of the present invention.

A person skilled in the art should understand that various modifications, combinations, sub-combinations, and replacements may be made to the present invention depending on design requirements and other factors, so long as they are within the scope of the appended claims and their equivalents.

The invention claimed is:

1. A data processing method applied to a first electronic device having a first image acquisition unit and a first display unit, the method comprising acquiring a first image, determining whether the first image satisfies a preset condition, and executing a first predetermined processing when the first image satisfies the preset condition, wherein during a video communication, analyzing at least a part of a body image of a communicator in the video communication on basis of communication images of the video communication, so as to monitor an action of the communicator in real time; and when an action of the communicator matches a target action in a preset set of actions, storing target image frames among communication images on basis of the action of the communicator that matches the target action, wherein the set of actions includes at least one target action, wherein acquiring a first image, determining whether the first image satisfies a preset condition, and executing a first predetermined processing when the first image satisfies the preset condition comprises:
- displaying a first object by the first display unit;
- acquiring a first image by the first image acquisition unit to determine whether the first image satisfies a preset condition, and generating a first label when the first image satisfies the preset condition; and
- obtaining first information that includes first association information indicating that the first label and the first object are associated, and in a communication state of the first electronic device and a second electronic device, simultaneously displaying the first image on a display unit of the second electronic device;

transmitting the first information to the second electronic device, displaying the first label on the display unit of the second electronic device on basis of the first information after the first information is received by the second electronic device; and acquiring second information of the second electronic device, wherein the second information includes second association information indicating that a second label and the first object are associated, and the second label is a label generated when the second image acquired by an image acquisition unit of the second electronic device satisfies the preset condition.

2. The method according to claim 1, wherein storing target image frames among the communication images on basis of the action of the communicator that matches the target action comprises:
- when the video communication ends, sequencing the target image frames on basis of acquiring time of the target image frames so as to generate a target image frame sequence; and
- storing the target image frame sequence.

3. The method according to claim 1, wherein:
- the target image frames include a first target image frame and a second target image frame;
- the first target image frame is an image frame including an action of the communicator that matches the target action among communication images acquired by one of an initiating terminal device and a called terminal device; and
- the second target image frame is an image frame having the same acquiring time as the first target image frame among image frames acquired by the other of the initiating terminal device and the called terminal device.

4. The method according to claim 1, wherein:
- the target image frames include a first target image frame and a second target image frame;
- the first target image frame is an image frame including an action of the communicator that matches the target action among communication images acquired by one of an initiating terminal device and a called terminal device; and
- the second target image frame is an image frame having an acquiring time that lags behind that of the first target image frame by a predetermined time amount among image frames acquired by the other of the initiating terminal device and the called terminal device.

5. The method according to claim 2, further comprising:
- when the video communication ends, storing a communication image frame sequence including communication images from start of the video communication to end thereof; and
- associating a communication image frame sequence for a video communication with the target image frame sequence stored for the video communication.

6. The method according to claim 1, wherein the first information further includes the first label, and/or first correspondence information that the first image and pre-stored data correspond, and the first label includes the first image, or an image obtained after processing the first image, or pre-stored data to which the first image corresponds.

7. The method according to claim 6, further comprising simultaneously displaying the first label and the first object.

8. An electronic device, comprising:
- an image acquisition unit configured to acquire a first image;
- a first display unit; and
- a processing unit configured to determine whether the first image satisfies a preset condition, and executing a first predetermined processing when the first image satisfies the preset condition wherein the processing unit further includes an action detection unit for, during a video communication, analyzing at least a part of a body image of a communicator in the video communication on basis of communication images of the video communication, so as to monitor an action of the communicator in real time; and the electronic device further comprises as storage unit configured for, when an action of the communicator matches a target action in a preset set of actions, storing target image frames among the communication images on basis of the action of the communicator that matches the target action, wherein the set of actions includes at least one target action, wherein the image acquisition unit further includes an information acquisition unit through which a first image is acquired;

the processing unit is further configured to determine whether the first image satisfies a preset condition, and to generate a first label when the first image satisfies the preset condition; and the electronic device further comprises a first acquisition unit configured to acquire first information that includes first association information indicating that the first label and the first object are associated a communication unit for, in a communication state of the electronic device and a second electronic device, simultaneously displaying the first image on a second display unit of the second electronic device;

an information transmission unit configured to transmit the first information to the second electronic device, displaying the first label on the second display unit on basis of the first information after the first information is received by the second electronic device; and a second acquisition unit configured to acquire second information of the second electronic device, wherein the second information includes second association information indicating that the second label and the first object are associated, and the second label is a label generated when the second image acquired by the second image acquisition unit of the second electronic device satisfies the preset condition.

9. The electronic device according to claim 8, wherein the storage unit includes:
- a sequence generation module configured for, when the video communication ends, sequencing the target image frames on basis of acquiring time of the target image frames so as to generate a target image frame sequence; and
- a storage module configured to store the target image frame sequence.

10. The electronic device according to claim 8, wherein:
- the target image frame includes a first target image frame and a second target image frame;
- the first target image frame is an image frame including an action of the communicator that matches the target action among communication images acquired by one of an initiating terminal device and a called terminal device; and
- the second target image frame is an image frame having the same acquiring time as the first target image frame among image frames acquired by the other one of the initiating terminal device and the called terminal device.

11. The electronic device according to claim 8, wherein the storage unit is further configured to, when the video communication ends, store a communication image frame sequence including communication images from start of the video communication to an end thereof; and associate a communication image frame sequence for a video communication with a target image frame sequence stored for the video communication.

12. The electronic device according to claim 8, wherein the first information further includes:
- the first label, and/or first correspondence information that the first image and pre-stored data correspond,
- and the first label includes:
- the first image, or an image obtained after processing the first image, or pre-stored data to which the first image corresponds.

13. The electronic device according to claim 8, further comprising a superimposition unit configured to simultaneously display the first label and the first object.

* * * * *